United States Patent [19]

Yale

[11] 4,014,705

[45] Mar. 29, 1977

[54] GLASS COMPOSITIONS

[75] Inventor: Brian Yale, Ormskirk, England

[73] Assignee: Pilkington Brothers Limited, St. Helens, England

[22] Filed: Dec. 23, 1974

[21] Appl. No.: 535,746

Related U.S. Application Data

[63] Continuation-in-part of Ser. No. 302,462, Oct. 31, 1972, abandoned.

[30] Foreign Application Priority Data

Nov. 3, 1971 United Kingdom ............. 51177/71

[52] U.S. Cl. .................................. 106/50; 106/52; 106/54; 106/99
[51] Int. Cl.² .................. C03C 13/00; C03C 3/04; C04B 31/06
[58] Field of Search ................ 106/50, 52, 54, 99

[56] References Cited

UNITED STATES PATENTS

| | | | |
|---|---|---|---|
| 2,640,784 | 6/1953 | Tiede | 106/50 |
| 2,882,173 | 4/1959 | Welsch | 106/50 |
| 3,013,888 | 12/1961 | de Lajarte | 106/50 |
| 3,294,557 | 12/1966 | de Lajarte | 106/50 |
| 3,783,092 | 1/1974 | Majundar | 106/50 |
| 3,861,926 | 1/1975 | Irlam | 106/50 |

FOREIGN PATENTS OR APPLICATIONS

| | | | |
|---|---|---|---|
| 727,779 | 10/1942 | Germany | 106/50 |
| 7,011,037 | 2/1971 | Netherlands | 106/50 |
| 1,200,732 | 9/1970 | United Kingdom | 106/99 |

*Primary Examiner*—Winston A. Douglas
*Assistant Examiner*—Mark Bell
*Attorney, Agent, or Firm*—Sughrue, Rothwell, Mion, Zinn & Macpeak

[57] ABSTRACT

Alkali-resistant continuously-drawn glass fibers, for use in the reinforcement of cement products, are composed of $SiO_2$ 67 to 82 mol.%, $ZrO_2$ 7 to 10 mol.%, $R_2O$ 9 to 22.5 mol.% (where R = Na, up to 5 mol.% of which may be replaced by Li or K), $F_2$ 3 to 9 mol.% and $Al_2O_3$ (computed as $AlO_{1.5}$) 0 to 5 mol.%, the permissible maximum value of the total of $SiO_2 + ZrO_2 + AlO_{1.5}$ being on a sliding scale dependent on the content of $ZrO_2$ and ranging (when $F_2 = 9$ mol.%) from 89 mol.% when $ZrO_2$ is 7 mol.% down to 87 mol.% when $ZrO_2$ is 10 mol.%, the said maximum value being reduced by a further 5 mol.% over the whole scale when $F_2 = 3$ mol.%. The fiberizing temperature is below 1350° C and the liquidus temperature is at least 40° C below the fiberizing temperature. Preferably, to ensure that the fiberizing temperature is below 1320° C, the said maximum value of $SiO_2 + ZrO_2 + AlO_{1.5}$ is further reduced by 1 mol.% over the whole scale.

5 Claims, 1 Drawing Figure

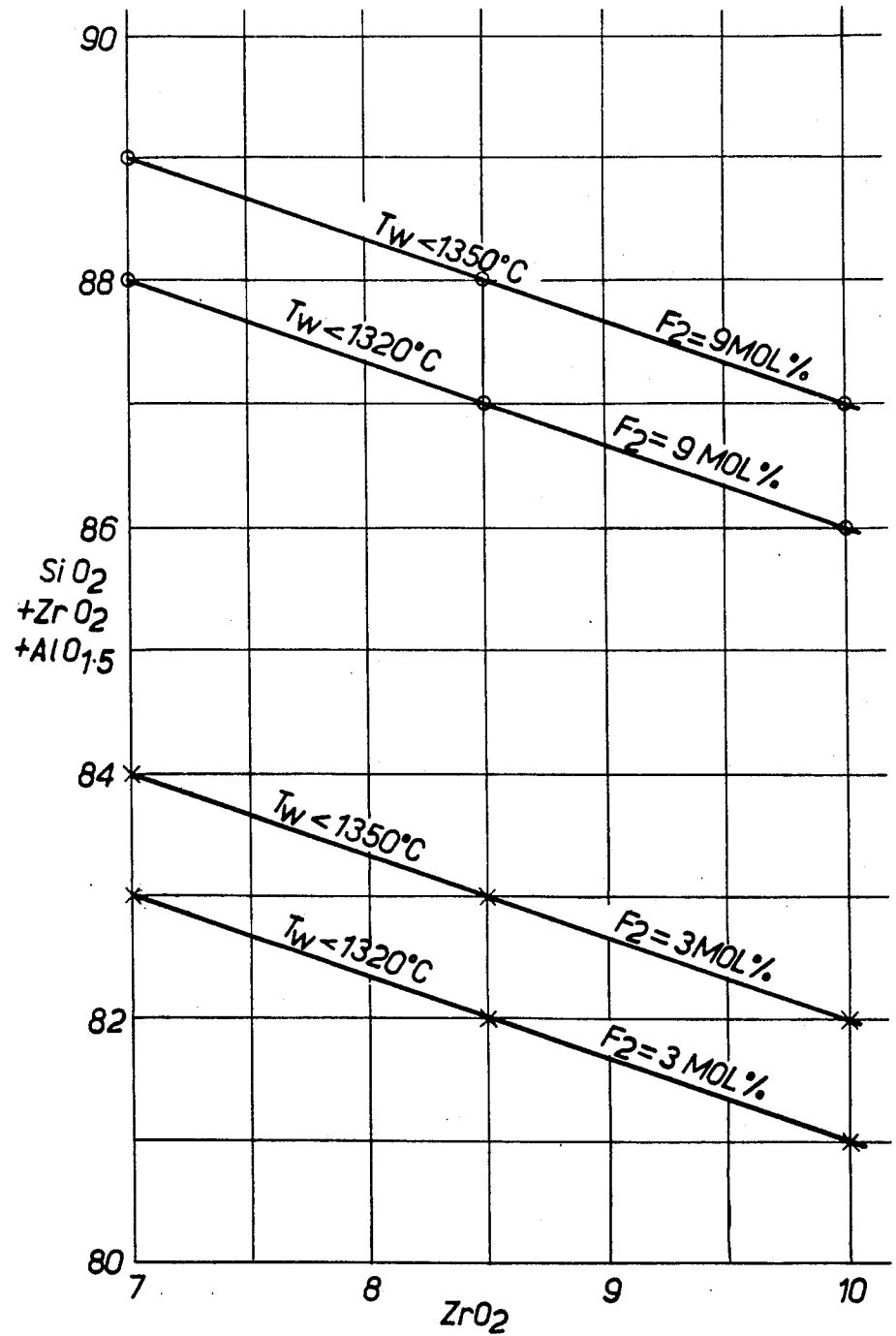

4,014,705

GLASS COMPOSITIONS

CROSS-REFERENCE TO RELATED APPLICATIONS

This application is a continuation-in-part of application Ser. No. 302462 filed Oct. 31, 1972, now abandoned.

BACKGROUND OF THE INVENTION

1. Field of the Invention

This invention relates to alkali-resistant continuously-drawn glass fibres. Glass fibres of the continuously-drawn type with a high resistance to attack by alkalis are particularly required for use as reinforcement for cementitious products.

2. Description of the Prior Art

These are basically two quite different types of glass fibres: glass wool fibres which are blown from streams of molten glass to attenuate them or which are spun out of apertures in a rotary spinner containing the molten glass, thus forming in either case an entangled wool-like mass of curved discontinuous filaments; and continuously drawn or continuous-filament (C.F.) glass fibres which are drawn as straight continuous filaments from multiple fine apertures in a bushing fed with the molten glass. Numbers of the continuous filaments are combined to form a strand, which may subsequently be chopped to a relatively short length (e.g. 2 inches) but the continuous filament glass fibre retains its distinctive characteristics of being composed of essentially straight parallel filaments. It is this characteristic which renders it suitable for use as reinforcement in composite materials by making impregnation of the fibres relatively easy, whereas glass wool fibres are extremely difficult to use because the random orientation of the filaments make it difficult to produce a uniform composite material without internal voids.

It is known that glass-fibre reinforced cement products can be made, using continuously drawn glass fibres, and that such products, after initial setting, have excellent mechanical strength characteristics, but with the normally available glass fibres made from the conventional composition known as E-glass these strength characteristics deteriorate quite rapidly due to the essentially alkaline nature of cement, particularly ordinary Portland cement, which causes the surface of the fibres to be attacked and their strength accordingly reduced.

To be capable of being successfully and economically drawn into fibres, a glass composition should have a particular combination of physical characteristics which is difficult to achieve in an alkali-resistant composition.

The fibres are drawn continuously from a bushing of platinum or platinum alloy. In order that these bushings should have a sufficient service life to make production of the fibres commercially attractive, it is necessary that the working temperature should not exceed 1350° C, and preferably 1320° C. This working temperature, at which the fibres are drawn from the bushing, is determined by the viscosity of the particular glass composition, which must be approximately $10^3$ poises for the production of satisfactory glass fibres. Thus the glass composition should be so selected as to have a viscosity of $10^3$ poises at a temperature not exceeding 1350° C and preferably not above 1320° C, this being the working temperature $T_W$.

As the glass fibres leave the bushing, they cool rapidly due to their high surface area in relation to their volume. In order to avoid crystallisation and consequent weakening or fracture of the fibres, it is necessary that the liquidus temperature of the glass should be at least 40° C below the working temperature, so that the glass reaches a relatively viscous state before it reaches the liquidus temperature and crystallisation is therefore much retarded if not stopped altogether.

The combination of these required characteristics, namely a working temperature ($T_W$) at which the viscosity is 1000 poises which does not exceed 1350° C, and preferably is not above 1320° C, and a liquidus temperature ($T_L$) which is at least 40° C less than $T_W$, is extremely difficult to achieve in a glass which has sufficient alkali resistance to withstand the alkaline environment in cement.

Resistance to alkalis can be imparted by incorporating a proportion of zirconia ($ZrO_2$) but this tends to result in an increase in the melting temperatures and in the viscosity at such temperatures. A range of glass compositions containing $ZrO_2$ is disclosed and claimed in U.S. patent application Ser. No. 305,395, now U.S. Pat. No. 3,861,926, in which the viscosity and liquidus temperatures are kept down within acceptable limits by careful choice of the constituents of the glass compositions. It is also known that melting temperatures and viscosity can be reduced by addition of fluorine in the form of a fluoride, but this addition was known to promote crystallisation in bulk glasses. In fact, it is common practice to produce opal glasses with fluorine levels of 2.5% to 4.0% by weight, the opal effect being due to small crystals of alkali metal fluorides and alkaline earth metal fluorides separated out from the vitreous matrix. In the continuous drawing of glass fibres, if such crystallisation took place, it would lead to breakage of the filaments as they were being formed, with serious effects on the production process, so that only small quantities of fluorine were hitherto thought to be permissible. Thus Application Ser. No. 305,395, now U.S. Pat. No. 3,861,926, puts a limit of 2 mol. % on the content of $CaF_2$.

SUMMARY OF THE INVENTION

I have now surprisingly found that, in a particular range of high-silica, zirconia-containing glasses, a relatively larger proportion of fluorine can be incorporated without causing the expected tendency to crystallise as fibres are drawn from the molten glass, thus enabling production of a new and useful range of alkali-resistant glass fibres capable of being used as reinforcement in cementitious products.

The invention accordingly resides in alkali-resistant continuously-drawn glass fibres having a glass composition consisting essentially of, in molar percentages on the oxide basis:

| | |
|---|---|
| $SiO_2$ | 67 to 82 |
| $ZrO_2$ | 7 to 10 |
| $R_2O$ | 9 to 22.5 |
| $F_2$ | 3 to 9 |
| $Al_2O_3$ | 0 to 5 |
| | (computed as $AlO_{1.5}$) | where R = Na, up to 5 mol. % of which may be replaced by Li or K, and the fluorine is included in substitution for oxygen in one or more of the oxides, the maximum value of the molar percentage represented by $SiO_2 + ZrO_2 + AlO_{1.5}$ being on a sliding scale dependent on the content of $ZrO_2$ ranging, when $F_2 + 9$ mol. %, from 89 mol. % when the $ZrO_2$ content is 7 mol. %, to 88 mol. % when the $ZrO_2$ content is 8.5 mol. %, down to 87 mol. % when the $ZrO_2$ content is 10 mol. %, the said maximum value being reduced by a further 5 mol. % over the whole scale when $F_2 = 3$ mol. %, the glass having a fiberizing temperature not exceeding 1350° C and a liquidus temperature at least 40° below the fiberizing temperature.

The limitation on the total of $SiO_2 + ZrO_2 + AlO_{1.5}$ is necessary to keep the fiberizing temperature down below 1350° C. Glasses falling within the above stated range of compositions can be fiberized at or below that temperature without serious risk of crystallisation of the fibres.

The molecular weight percentage of alumina is calculated on the basis of the formula $AlO_{1.5}$ because one atom of aluminium replaces one atom of silicon, so it is the number of atoms of aluminium which is relevant rather than the number of molecules of $Al_2O_3$.

Preferably, to ensure that the fiberizing temperature does not exceed 1320° C, the maximum value of the molar percentage represented by $SiO_2 + ZrO_2 + AlO_{1.5}$ ranges, when $F_2 = 9$ mol. %, from 88 mol. % when the $ZrO_2$ content is 7 mol. % to 87 mol. % when the $ZrO_2$ content is 8.5 mol. % down to 86 mol. % when the $ZrO_2$ content is 10 mol. %, and is reduced by a further 5 mol. % over the whole scale when $F_2 = 3$ mol. %.

The glass composition may further comprise up to 11 mol. % R'O, where R' = Ca, up to 10 mol. % of which may be replaced by mgO and/or MnO and up to 5 mol. % of which may be replaced by BaO, SrO, or ZnO or any combination thereof, the total of MgO, MnO, BaO, SrO and ZnO not exceeding 10 mol. %.

Further components of the glass composition may comprise up to 5 mol.% titanium oxide, (expressed as $TiO_2$) boric oxide (expressed as $BO_{1.5}$) or iron oxide (expressed as $FeO_{1.5}$) or any combination thereof, the total of $AlO_{1.5}$, $TiO_2$, $BO_{1.5}$ and $FeO_{1.5}$ not exceeding 10 mol.%.

It will be understood that it is immaterial in what form the fluorine is added to the batch; it may for example be added as $Na_2—SiF_6$ or $Na_2AlF_6$. In the glass, fluorine will substitute for oxygen (2 atoms of fluorine replacing one atom of oxygen, i.e. $F_2 + O$) in such a manner that the fluorine cannot be allocated wholly to a particular metal (say Na or Ca). It is therefore convenient to express the molar percentages of the elements (other than O and F) on the oxide basis, adding up to 100, and to express the molar percentages of $F_2$ as an additional figure to be considered as a substitution for O in the oxides specified. The alternative is to specify the fluorine content as $CaF_2$ or $Na_2F_2$, but this can be misleading since the fluorine is not necessarily present in either of these forms and misleadingly low figures for $Na_2O$ and/or CaO may have to be shown.

BRIEF DESCRIPTION OF THE DRAWING

The accompanying drawing is a graphical representation of the variations of the permissible maximum figures for the molar proportions of $SiO_2 + ZrO_2 + AlO_{1.5}$ with varying molar proportions of $ZrO_2$, firstly with a fluorine content of 9 mol. % and secondly with a fluorine content of 3 mol. %, which maxima must be observed to ensure that the fiberizing temperatures $T_{W'}$ do not exceed 1350° C or, preferably, 1320° C.

DETAILED DESCRIPTION OF THE INVENTION

Table 1A illustrates the preferred ranges within which the molar proportions of $SiO_2$ and $Na_2O$ may be varied inversely to one another, firstly for molar proportions of $ZrO_2$ of 7.0, 8.5 and 10.0%, secondly for varying molar proportions of CaO between 0 and 11%, and thirdly for molar proportions of $F_2$ of 4.0 and 8.0%. These ranges have been worked out to give fiberizing temperatures $T_{W'}$ below 1350° C, and liquidus temperatures $T_L$ at least 40° C below $T_{W'}$. The following Table 1B sets out more limited ranges which give fiberizing temperatures below the preferred figure of 1320° C, again with $T_{W'} - T_L > 40°$ C.

TABLE 1A

| $ZrO_2$ | CaO | $F_2 = 4.0$ mol.% | $F_2 = 8.0$ mol% |
|---|---|---|---|
| | 0 | $SiO_2$ 75 – 78%<br>$Na_2O$ 18 – 15% | $SiO_2$ 75 – 81 %<br>$Na_2O$ 18 – 12 |
| | 2 | $SiO_2$ 73 – 78<br>$Na_2O$ 18 – 13 | $SiO_2$ 73 – 81<br>$Na_2O$ 18 – 10 |
| | 4 | $SiO_2$ 71 – 77<br>$Na_2O$ 18 – 12 | $SiO_2$ 71 – 79<br>$Na_2O$ 18 – 10 |
| 7.0% | 6 | $SiO_2$ 69 – 77<br>$Na_2O$ 18 – 10 | $SiO_2$ 70 – 77<br>$Na_2O$ 17 – 10 |
| | 8 | $SiO_2$ 68 – 76<br>$Na_2O$ 17 – 9 | $SiO_2$ 69 – 76<br>$Na_2O$ 16 – 9 |
| | 10 | $SiO_2$ 68 – 73 | None |
| | 11 | $Na_2O$ 15 – 10<br>$SiO_2$ 69 – 71 | None |
| | 0 | $Na_2O$ 13 – 11<br>$SiO_2$ 69 – 76.0%<br>$Na_2O$ 22.5 – 15.5 | $SiO_2$ 69.5 – 78.5%<br>$Na_2O$ 22.0 – 13.0 |
| 8.5% | 2 | $SiO_2$ 69 – 76.0<br>$Na_2O$ 20.5 – 13.5 | $SiO_2$ 69.5 – 78.0<br>$Na_2O$ 20.0 – 11.5 |
| | 4 | $SiO_2$ 68.5 – 75.0<br>$Na_2O$ 19.0 – 12.5 | $SiO_2$ 69.5 – 76.0<br>$Na_2O$ 18.0 – 11.5 |
| | 6 | $SiO_2$ 69.0 – 74.0<br>$Na_2O$ 16.5 – 11.5 | $SiO_2$ 70.5 – 73.5<br>$Na_2O$ 15.0 – 12.0 |
| 8.5% | 8 | $SiO_2$ 70.0 – 72.0 | None |
| | 0 | $Na_2O$ 13.5 – 11.5<br>$SiO_2$ 68 – 73.0%<br>$Na_2O$ 22 – 17.0 | $SiO_2$ 69 – 75%<br>$Na_2O$ 21 – 15 |
| | 2 | $SiO_2$ 68.5 – 73.0<br>$Na_2O$ 19.5 – 15.0 | $SiO_2$ 69.5 – 75.0<br>$Na_2O$ 18.5 – 13.0 |
| 10.0% | 4 | $SiO_2$ 68.5 – 73.0<br>$Na_2O$ 17.5 – 13.0 | $SiO_2$ 69.5 – 73.0<br>$Na_2O$ 16.5 – 13.0 |
| | 6 | $SiO_2$ 69.0 – 72.0<br>$Na_2O$ 15.0 – 12.0 | None |

TABLE 1B

| $ZrO_2$ | CaO | $F_2 = 4.0$ mol.% | $F_2 = 8.0$ mol.% |
|---|---|---|---|
| | 0 | $SiO_2$ 75 – 77%<br>$Na_2O$ 16 – 18 | $SiO_2$ 75 – 80%<br>$Na_2O$ 13 – 18 |
| | 2 | $SiO_2$ 73 – 77<br>$Na_2O$ 14 – 18 | $SiO_2$ 73 – 80<br>$Na_2O$ 11 – 18 |
| 7.0% | 4 | $SiO_2$ 71 – 77<br>$Na_2O$ 12 – 18 | $SiO_2$ 71 – 79<br>$Na_2O$ 10 – 18 |
| | 6 | $SiO_2$ 69 – 77<br>$Na_2O$ 10 – 18 | $SiO_2$ 70 – 77<br>$Na_2O$ 10 – 17 |
| | 8 | $SiO_2$ 68 – 75<br>$Na_2O$ 10 – 17 | $SiO_2$ 69 – 75<br>$Na_2O$ 10 – 16 |
| 7.0% | 10 | $SiO_2$ 68 – 73 | None |
| | 11 | $Na_2O$ 10 – 15<br>$SiO_2$ 69 – 71 | None |
| | 0 | $Na_2O$ 11 – 13<br>$SiO_2$ 70.0 – 74.5%<br>$Na_2O$ 17.0 – 21.5 | $SiO_2$ 70.0 – 77.5%<br>$Na_2O$ 14.0 – 21.5 |
| | 2 | $SiO_2$ 69.0 – 74.5<br>$Na_2O$ 15.0 – 20.5 | $SiO_2$ 69.5 – 77.5<br>$Na_2O$ 12.0 – 20.0 |
| 8.5% | 4 | $SiO_2$ 68.5 – 74.5<br>$Na_2O$ 13.0 – 19.0 | $SiO_2$ 69.5 – 76.0<br>$Na_2O$ 11.5 – 18.0 |
| | 6 | $SiO_2$ 69.0 – 74.0<br>$Na_2O$ 11.5 – 16.5 | $SiO_2$ 70.5 – 73.5<br>$Na_2O$ 12.0 – 15.0 |
| | 8 | $SiO_2$ 70.0 – 72.0 | |

TABLE 1B-continued

| $ZrO_2$ | CaO | $F_2 = 4.0$ mol.% | $F_2 = 8.0$ mol.% |
|---|---|---|---|
| | | | None |
| | 0 | $Na_2O$ 11.5 – 13.5 | |
| | | $SiO_2$ 68.0 – 72.0% | $SiO_2$ 69.0 – 75.0% |
| | | $Na_2O$ 17.0 – 22.0 | $Na_2O$ 15.0 – 21.0 |
| | 2 | $SiO_2$ 70.0 – 72.0 | $SiO_2$ 70.0 – 75.0 |
| 10.0% | | $Na_2O$ 16.0 – 18.0 | $Na_2O$ 13.0 – 18.0 |
| | 4 | $SiO_2$ 68.5 – 72.0 | $SiO_2$ 69.0 – 73.0 |
| | | $Na_2O$ 14.0 – 17.5 | $Na_2O$ 13.0 – 17.0 |
| | 6 | $SiO_2$ 68.5 – 71.0 | |
| | | | None |
| | | $Na_2O$ 13.0 – 15.5 | |

Twenty one specific glass compositions in accordance with the invention and their relevant physical characteristics, are set out in Table 2 (A, B and C). In Table 2A, the constituents of these glasses, other than O and F, are set out in molar percentages on the oxide basis, adding up to 100, and the molar percentage of fluorine is given as an additional figure, though in fact the fluorine will be present in substitution for part of the oxygen from one or more of the oxides, as explained above, For comparison, Table 2B sets out the constitution of the same glasses expressing the molar percentage of fluorine in terms of $CaF_2$ and/or $Na_2F_2$, though in practice it may be added in any convenient form, such as $Na_2SiF_6$ or $Na_3AlF_6$ (cryolite). It will be seen that this method of setting out the constituents can result in misleadingly low figures for $Na_2O$ and/or CaO. Finally, Table 2C sets out the constitution of the same glasses in weight percentages.

$T_L$ indicates the liquidus temperature. $T_W$ indicates the temperature at which the viscosity of the glass is $10^3$ poises, i.e. the working or fiberizing temperature. It will be seen that in each case $T_W - T_L > 40°$ C.

TABLE 2A

| Constituents 68EF | 165 | 166 | 169 | 170 | 176 | 179 | 180 | 189 | 208 | 209 | 210 |
|---|---|---|---|---|---|---|---|---|---|---|---|
| $SiO_2$ | 75 | 70 | 74 | 70 | 73 | 69 | 70 | 73 | 72 | 71 | 70 |
| $ZrO_2$ | 7 | 10 | 10 | 10 | 8.5 | 7 | 7 | 7 | 8.5 | 10 | 7 |
| $Na_2O$ | 11 | 16 | 13 | 16 | 12.5 | 13 | 14 | 13 | 14.5 | 14 | 13 |
| CaO | 7 | 4 | 3 | 4 | 6.0 | 6 | 4 | 2 | | | |
| MgO | | | | | | | 5 | | | | |
| SrO | | | | | | | | | 5 | | |
| BaO | | | | | | 5 | | | | | |
| ZnO | | | | | | | | 5 | | | |
| MnO | | | | | | | | | | 5 | 10 |
| $F_2$ | 5 | 4 | 7 | 8 | 3 | 6 | 4 | 5 | 6 | 5 | 4 |
| $T_L$ | 1140° | 1130° | 1250° | 1120° | 1200° | 1085° | 1085° | 1170° | 1175° | 1200° | 1160° |
| $T_W$ | 1310° | 1280° | 1320° | 1230° | 1300° | 1210° | 1200° | 1240° | 1260° | 1285° | 1220° |

| Constituents 68EF | 185 | 186 | 207 | 211 | 212 | 213 | 216 | 217 | 218 | 219 |
|---|---|---|---|---|---|---|---|---|---|---|
| $SiO_2$ | 70 | 68 | 77 | 74 | 67 | 68 | 82 | 76 | 69 | 70 |
| $ZrO_2$ | 9 | 8 | 7 | 8.5 | 7 | 9 | 7 | 7 | 8.5 | 7 |
| $Na_2O$ | 12 | 13 | 12 | 6.5 | 15 | 13 | 11 | 9 | | 12 |
| CaO | 6 | 6 | | 6.0 | 6 | 5 | | 8 | 22.5 | 11 |
| $Li_2O$ | 3 | | | | | | | | | |
| $K_2O$ | | | | 5.0 | | | | | | |
| $TiO_2$ | | 4 | | | | | | | | |
| $BO_{1.5}$ | | | | | | 5 | | | | |
| $FeO_{1.5}$ | | 5 | | | | | | | | |
| $AlO_{1.5}$ | | | | | 5 | | | | | |
| $F_2$ | 4 | 7 | 8 | 6 | 6 | 8 | 9 | 4 | 5 | 4 |
| $T_L$ | 1200° | 1170° | 1260° | 1210° | 1175° | 1200° | 1300° | 1205° | 1185° | 1200° |
| $T_W$ | 1250° | 1225° | 1330° | 1280° | 1230° | 1255° | 1350° | 1295° | 1235° | 1240° |

TABLE 2B

| Constituents 68EF | 165 | 166 | 169 | 170 | 176 | 179 | 180 | 189 | 208 | 209 | 210 |
|---|---|---|---|---|---|---|---|---|---|---|---|
| $SiO_2$ | 75 | 70 | 74 | 70 | 73 | 69 | 70 | 73 | 72 | 71 | 70 |
| $ZrO_2$ | 7 | 10 | 10 | 10 | 8.5 | 7 | 7 | 7 | 8.5 | 10 | 7 |
| $Na_2O$ | 11 | 16 | 9 | 12 | 12.5 | 13 | 14 | 8 | 8.5 | 9 | 9 |
| $Na_2F_2$ | | | 4 | 4 | | | | 5 | 6.0 | 5 | 4 |
| CaO | | 2 | | | 3.0 | | | 2 | | | |
| $CaF_2$ | | 5 | 4 | 3 | 4 | 3.0 | 6 | 4 | | | |
| MgO | | | | | | | 5 | | | | |
| SrO | | | | | | | | | 5 | | |
| BaO | | | | | | 5 | | | | | |
| ZnO | | | | | | | | 5 | | | |
| MnO | | | | | | | | | | 5 | 10 |
| $T_L$ | 1140° | 1130° | 1250° | 1120° | 1200° | 1085° | 1085° | 1170° | 1175° | 1200° | 1160° |
| $T_W$ | 1310° | 1280° | 1320° | 1230° | 1300° | 1210° | 1200° | 1240° | 1260° | 1285° | 1220° |

| Constituents 68EF | 185 | 186 | 207 | 211 | 212 | 213 | 216 | 217 | 218 | 219 |
|---|---|---|---|---|---|---|---|---|---|---|
| $SiO_2$ | 70 | 68 | 77 | 74 | 67 | 68 | 82 | 76 | 69 | 70 |
| $ZrO_2$ | 9 | 8 | 7 | 8.5 | 7 | 9 | 7 | 7 | 8.5 | 7 |
| $Na_2O$ | 12 | 6 | 4 | | 15 | 10 | 2 | 9 | | 12 |
| $Na_2F_2$ | | 7 | 8 | 6.5 | | 3 | 9 | | 17.5 | |
| CaO | 2 | 6 | | | 6 | | | 4 | 5 | 7 |
| $CaF_2$ | 4 | | | 6.0 | | 5 | | 4 | | 4 |

TABLE 2B-continued

| | | | | | | | | | | |
|---|---|---|---|---|---|---|---|---|---|---|
| $Li_2O$ | 3 | | | | | | | | | |
| $K_2O$ | | | | 5.0 | | | | | | |
| $TiO_2$ | | | 4 | | | | | | | |
| $BO_{1.5}$ | | | | | | 5 | | | | |
| $FeO_{1.5}$ | | 5 | | | | | | | | |
| $AlO_{1.5}$ | | | | | 5 | | | | | |
| $T_l$ | 1200° | 1170° | 1260° | 1210° | 1175° | 1200° | 1300° | 1205° | 1185° | 1200° |
| $T_w$ | 1250° | 1225° | 1330° | 1280° | 1230° | 1255° | 1350° | 1295° | 1235° | 1240° |

T%/% (margin note)

TABLE 2C

| Constituents | 68EF | 165 | 166 | 169 | 170 | 176 | 179 | 190 | 189 | 208 | 209 | 210 |
|---|---|---|---|---|---|---|---|---|---|---|---|---|
| $SiO_2$ | | 69.9 | 63.2 | 66.9 | 63.2 | 67.0 | 59.9 | 66.1 | 66.7 | 63.7 | 63.5 | 63.9 |
| $ZrO_2$ | | 13.4 | 18.7 | 18.5 | 18.7 | 16.0 | 12.4 | 13.6 | 13.1 | 15.4 | 18.3 | 13.1 |
| $Na_2O$ | | 10.6 | 14.9 | 12.1 | 14.9 | 11.9 | 11.7 | 13.7 | 12.3 | 13.3 | 12.9 | 12.3 |
| CaO | | 6.1 | 3.4 | 2.5 | 3.4 | 5.1 | 4.9 | 3.5 | 1.7 | | | |
| MgO | | | | | | | | 3.1 | | | | |
| SrO | | | | | | | | | | 7.6 | | |
| BaO | | | | | | | 11.1 | | | | | |
| ZnO | | | | | | | | | 6.2 | | | |
| MnO | | | | | | | | | | | 5.3 | 10.8 |
| $F_2$ | | 3.0 | 2.3 | 4.0 | 4.6 | 1.7 | 3.3 | 2.3 | 2.9 | 3.4 | 2.8 | 2.2 |

| Constituents | 68EF | 185 | 186 | 207 | 211 | 212 | 213 | 216 | 217 | 218 | 219 |
|---|---|---|---|---|---|---|---|---|---|---|---|
| $SiO_2$ | | 64.8 | 62.5 | 70.6 | 67.1 | 62.8 | 63.3 | 76.1 | 71.0 | 62.9 | 65.4 |
| $ZrO_2$ | | 17.1 | 14.6 | 13.2 | 15.3 | 13.4 | 17.2 | 13.3 | 13.4 | 15.9 | 13.4 |
| $Na_2O$ | | 11.5 | 12.0 | 11.4 | 5.9 | 14.5 | 12.5 | 10.6 | 8.7 | 21.2 | 11.6 |
| CaO | | 5.2 | 5.0 | | 4.9 | 5.2 | 4.3 | | 6.9 | | 9.6 |
| $Li_2O$ | | 1.4 | | | | | | | | | |
| $K_2O$ | | | | | 6.9 | | | | | | |
| $TiO_2$ | | | | 4.9 | | | | | | | |
| $B_2O_3$ | | | | | | | 2.7 | | | | |
| $Fe_2O_3$ | | | 5.9 | | | | | | | | |
| $Al_2O_3$ | | | | | | 4.0 | | | | | |
| $F_2$ | | 2.3 | 3.9 | 4.6 | 3.3 | 3.3 | 4.7 | 5.3 | 2.4 | 2.9 | 2.4 |

The glasses set out in Table 2 were tested for alkali resistance in comparison with samples of window glass (sold in fibre form as A glass), and the standard glass used for reinforcement of plastics known as E glass. The tests were carried out by crushing each sample and taking the fraction held between a 36 BS and a 52 BS sieve, washed to remove dust particles. 10g of each samples were placed in a platinum crucible and covered with 50 ml of the selected reagent. Conductivity water, N/10 and N sodium hydroxide solution were the three reagents used in turn. The crucible was heated to about 120° C under pressure of about 14 p.s.i. in an autoclave for 30 minutes, the solution was then filtered and analysed for dissolved oxides leached from the glass sample. Table 3 shows the maximum amounts of dissolved oxides in milligrams per litre which are acceptable for alkali-resistant glasses used in cement, compared with the amounts found for samples of A glass and E glass. The tests on the glasses of Table 2 showed that they gave results well within the acceptable limits shown.

TABLE 3

Maximum for

TABLE 3-continued

| In water | alkali-resistant glass | A | E |
|---|---|---|---|
| $SiO_2 + Al_2O_3 + B_2O_3 + ZrO_2 + TiO_2$ | 25 mg/l | 82 | 28 |
| $Na_2O + K_2O + Li_2O$ | 50 mg/l | 45 | 6 |
| In N/10 sodium hydroxide | | | |
| $SiO_2 + Al_2O_3 + B_2O_3 + ZrO_2 + TiO_2$ | 60 mg/l | 395 | 305 |
| In N sodium hydroxide | | | |
| $SiO_2 + Al_2O_3 + B_2O_3 + ZrO_2 + TiO_2$ | 150 mg/l | — | 385 |

Thus the glasses of the present invention exhibit considerably better resistance to attack by alkali than the known glasses previously used in fibre form for reinforcement of plastics.

Specific results of such tests for eight of the glasses of Table 2 are set out in Table 4 below.

TABLE 4

| Glass No. 68EF | 165 | 166 | 169 | 176 | 179 | 180 | 185 | 186 |
|---|---|---|---|---|---|---|---|---|
| Total oxides dissolved in: | | | | | | | | |
| Water | 16.6 | 17.9 | 16 | 18 | 25 | 20 | 15 | 13.5 |
| N/10 NaOH | 46 | 12 | 28 | 32 | 25 | 37 | 36 | 23 |
| N. NaOH | 122 | 57 | 60 | 74 | 83 | 100 | 71 | 76 |

The glass fibres can be produced in conventional manner, though it is necessary to take precautions, as is customary when dealing with fluorine-containing glass compositions, to avoid loss of fluorine during melting and fining of the glass. Thus it is preferred to melt the batch in a known type of "cold-top" melter, in which the batch materials are fed from above into the melting furnace, so as to reduce or eliminate the escape of fluorine to the atmosphere. The molten glass thus retains the composition of the batch while being melted and fined and fed along a channel or fore-hearth to the bushing. The drawing of the continuous fibres from the molten glass then follows conventional practice, using a multiple bushing of platinum or platinum alloy. It will be realised that the rapid cooling effected as the glass filaments leave the bushing effectively prevents any subsequent loss of fluorine or other constituents so that the fibres produced have the same composition as the batch.

The glass fibres can be incorporated in cementitious products, e.g. cement boards, by a spray-up technique in which a cement slurry and chopped glass fibres are sprayed simultaneously on to a paper-covered perforated face of a suction mould. Alternatively, the fibres may be pre-mixed with the cement before moulding, but in this case a friction reducing substance such as polyethylene oxide must be applied to the fibres before mixing, to prevent balling of the fibres.

I claim:

1. Continuously-drawn alkali-resistant glass fibres having a glass composition consisting essentially of, in molar percentages on the oxide basis:

| | |
|---|---|
| $SiO_2$ | 67 to 82 |
| $ZrO_2$ | 7 to 10 |
| $R_2O$ | 9 to 22.5 |
| $F_2$ | 3 to 9 |
| $Al_2O_3$ | 0 to 5 |
| | (computed as $AlO_{1.5}$) | where R = Na, up to 5 mol.% of which may be replaced by Li or K, and the fluorine is included in substitution for oxygen in one or more of the oxides, the maximum value of the molar percentage represented by $SiO_2$ + $ZrO_2$ + $AlO_{1.5}$ being on a sliding scale dependent on the content of $ZrO_2$ ranging, when $F_2$ = 9 mol.%, from 89 mol.% when the $ZrO_2$ content is 7 mol.% to 88 mol.% when the $ZrO_2$ content is 8.5 mol.% down to 87 mol.% when the $ZrO_2$ content is 10 mol.% the said maximum value being reduced by a further 5 mol.% over the whole scale when $F_2$ = 3 mol.%, the glass having a fiberizing temperature not exceeding 1350° C and a liquidus temperature at least 40° C below the fiberizing temperature.

2. Glass fibres according to claim 1, further comprising up to 11 mol.% R'O, where R' = Ca, up to 10 mol.% of which may be replaced by MgO and/or MnO and up to 5 mol.% of which may be replaced by BaO, SrO, or ZnO or any combination thereof, the total of MgO, MnO, BaO, SrO and ZnO not exceeding 10 mol.%.

3. Glass fibres according to claim 1, further comprising up to 5 mol.% titanium oxide (expressed as $TiO_2$) boric oxide (expressed as $BO_{1.5}$) or iron oxide (expressed as $FeO_{1.5}$) or any combination thereof, the total of $AlO_{1.5}$, $TiO_2$, $BO_{1.5}$ and $FeO_{1.5}$ not exceeding 10 mol.%.

4. Continuously-drawn alkali-resistant glass fibers having a glass composition consisting essentially of, in molar percentages on the oxide basis:

| | |
|---|---|
| $SiO_2$ | 67 to 82 |
| $ZrO_2$ | 7 to 10 |
| $R_2O$ | 9 to 22.5 |
| $F_2$ | 3 to 9 |
| $Al_2O_3$ | 0 to 5 |
| | (computed as $AlO_{1.5}$) | where R = Na, up to 5 mol.% of which may be replaced by Li or K, and the fluorine is included in substitution for oxygen in one or more of the oxides, the maximum value of the molar percentage represented by $SiO_2$ + $ZrO_2$ + $AlO_{1.5}$ being on a sliding scale dependent on the content of $ZrO_2$ ranging, when $F_2$ = 9 mol.%, from 88 mol.% when the $ZrO_2$ content is 7 mol.% to 87 mol% when the $ZrO_2$ content is 8.5 mol.% down to 86 mol.% when the $ZrO_2$ content is 10 mol.% the said maximum value being reduced by a further 5 mol.% over the whole scale when $F_2$ = 3 mol.%, the glass having a fiberizing temperature not exceeding 1350° C and a liquidus temperature at least 40° C below the fiberizing temperature.

5. Cementitious products reinforced with glass fibres according to claim 1.

* * * * *